United States Patent Office 3,395,231
Patented July 30, 1968

3,395,231
SOIL-BORNE NEMATODE CONTROL BY SEEDS TREATED WITH 2 - CHLORO - 4 - HALOPHENYL ESTERS OF ALKOXYETHANESULFONIC ACIDS
Lyle V. White, Modesto, Calif., assignor to Shell Oil Company, New York, N.Y., a corporation of Delaware
No Drawing. Filed July 29, 1965, Ser. No. 475,851
8 Claims. (Cl. 424—303)

ABSTRACT OF THE DISCLOSURE

Nematode control by 2-chloro-4-halophenyl esters of alkoxyethanesulfonic acids.

---

This invention relates to a novel method for the control of root infesting parasitic nematodes. In particular it relates to the use of a novel class of aromatic esters of substituted ethanesulfonic acids of particular configuration as seed treating agents and to novel seed treating compositions containing them.

To control root infesting nematodes with conventional volatile nematocides the farmer generally has to apply large quantities of the active ingredient per acre. Quantities up to 20 gallons per acre are frequently required for nematode control. Use of such large quantities requires specialized application equipment. Further most of the currently employed chemicals are highly volatile and require proper placement in the soil. In addition most of the popular nematocides are quite phytotoxic and the soil must be aerated for several days after their use. This practice places a severe limitation on the types of crops upon which such nemotocides can be used. In general the use of nematocides has been restricted to high value crops.

It is an object of this invention to provide an effective method of nematode control which obviates the need for application of large quantities of chemical to soil. It is a further object of this invention to provide a safe, inexpensive and convenient method for the application of nematocides. Still another object is to provide a method of nematode control particularly adapted to relatively low value crops.

These and other objects are accomplished by use of certain dihalo alkoxy ethanesulfonic acid esters as seed treating agents. These esters useful as seed treating agents and comprising the active component of nematocidal seed treating compositions are characterized by the formula:

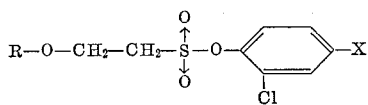

wherein R is hydrogen, methyl, ethyl, methoxyethyl or allyl; X is chlorine when R is hydrogen, allyl or ethyl and X is bromine when R is methyl or methoxyethyl.

It has been found that the compounds of the above formula have the unexpected property of being efficient agents for the control of soil-borne nematodes when applied as seed dressings. These compounds are highly residual. They are not appreciably volatile nor do they decompose or leach readily. When applied to seeds they are retained in intimate contact with the seed coat to afford protection from nematode attack to the newly formed roots.

Thus when treated seed is planted the root system of the plant is able to become established early.

It has been found that the seed treatment compounds of the method of the invention can be applied to the seeds as liquid seed soaking treatments, as slurries, or as dry seed coating materials. In the case of the liquid treatments, is has been shown that the active ingredient is effective even after the seed has been repeatedly washed with running water. This illustrates that the ethanesulfonate becomes intimately bound with the seed and probably accounts for its prolonged effectiveness in the rhizosphere of the root.

Typical preparations are given of compounds of the method of this invention as well as examples of their use as seed treatments. These should not be construed as in any way limiting the invention. Parts given in the examples are parts by weight unless otherwise noted.

Example I.—Preparation of 4-bromo-2-chlorophenyl 2-methoxyethanesulfonate

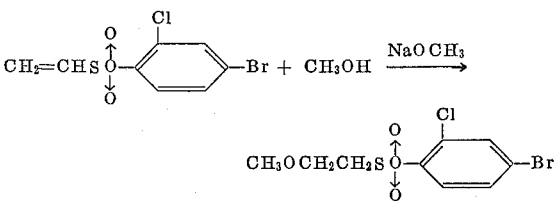

The 4-bromo-2-chlorophenylethenesulfonate was prepared by reacting 4-bromo-2-chlorophenol with 2-chloroethanesulfonyl chloride in the presence of triethylamine.

To 15.1 parts of 4-bromo-2-chlorophenyl ethenesulfonate in 20 parts by volume of methanol, cooled to 2° C., 0.2 part of sodium methylate in 15 parts by volume of methanol was added drop-wise. The mixture was stirred until the reaction was complete and then quenched with 0.3 part of glacial acetic acid. The reaction mixture was stripped and the product was vacuum distilled, yielding 66% of 4-bromo-2-chlorophenyl 2-methoxyethanesulfonate, B.P. 141–143° C. (0.1 torr.)

| Analysis | Br, percent/w. | Cl, percent/w. | Acid elem., g./equiv. |
|---|---|---|---|
| Calculated for $SO_4ClBrC_9H_{10}$ | 24.3 | 10.7 | 82.3 |
| Found | 24.6 | 10.7 | 83.6 |

Example II.—Preparation of 2,4-dichlorophenyl 2-hydroxyethanesulfonate

A. A solution of 266.2 parts of 2,4-dichlorophenol and 167.4 parts of treithylamine in 470 parts of ether was added to a solution of 281 parts of isethionyl chloride acetate in 1050 parts of ether at 10–20° C. The addition was carried out over a 1½ hour period, after which the reactants were stirred for over 2 hours, then filtered and the filtrate was washed and dried over sodium sulfate. The product was stripped, reprecipitated, and twice recrystallized to yield 283 parts, 58% of theory, melting point 31–32° C. Structure confirmed by elemental analysis.

| Analysis | Cl, percent/w. | acid elem., g./equiv. |
|---|---|---|
| Calculated for $SO_4Cl_2C_{10}H_{10}$ | 22.7 | 78.2 |
| Found | 22.9 | 79.6 |

B. 49.6 parts of 2,4-dichlorophenyl 2-hydroxyethanesulfonate acetate, one part p-toluene sulfonic acid plus 100 parts by volume of methanol were combined and refluxed at 54° C. while methyl acetate was slowly removed. After 2 hours the reaction mixture was cooled to 30° C. and one part of sodium carbonate was added. The mixture was stripped leaving a tan syrup which was dissolved in benzene, water-washed, filtered and then concentrated to give 75% yield of 2,4-dichlorophenyl 2-hydroxyethanesulfonate.

| Analysis | Cl, percent/w. | acid elem., g./equiv. |
|---|---|---|
| Calculated for $SO_4Cl_2C_8H_8$ | 26.2 | 67.8 |
| Found | 26.2 | 69.4 |

Example III.—Preparation of 2,4-dichlorophenyl 2-allyloxyethanesulfonate

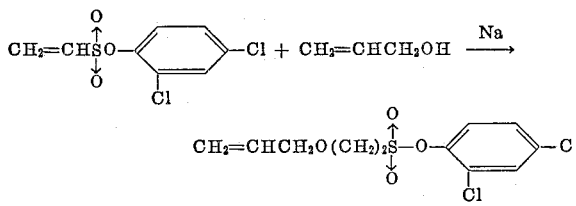

The 2,4-dichlorophenyl ethenesulfonate was prepared by reacting 2,4-dichlorophenol with 2-chloroethanesulfonyl chloride in the presence of triethylamine.

40 parts by volume of allyl alcohol was added dropwise to 25.3 parts of 2,4-dichlorophenyl ethenesulfonate at 2° C. While the reaction was stirred 0.2 part of sodium in 20 parts by volume of allyl alcohol was added slowly over a 5 minute period. The reaction mixture was cooled and then quenched with 0.8 part of glacial acetic acid. The reaction mixture was taken up in 150 parts by volume of methylene chloride, water-washed, then dried over sodium sulfate. The reaction product was stripped, vacuum distilled, yielding 81% of 2,4-dichlorophenyl 2-allyloxyethanesulfonate, B.P. 135–137° C. (0.1 torr.).

| Analysis | Cl, percent/w. | acid elem., g./equiv. |
|---|---|---|
| Calculated for $SO_4Cl_2C_{11}H_{12}$ | 22.8 | 77.8 |
| Found | 23.0 | 78.7 |

Example IV.—Preparation of 2,4-dichlorophenyl 2-ethoxyethanesulfonate

In a manner similar to Example III, ethyl alcohol was added drop-wise to 2,4-dichlorophenyl ethenesulfonate to give 73% yield of 2,4-dichlorophenyl 2-ethoxyethanesulfonate, B.P. 129–131° C. (0.1 torr.).

| Analysis | Cl, percent/w. | Acid elem., g./equiv. |
|---|---|---|
| Calculated for $SO_4Cl_2C_{10}H_{12}$ | 23.7 | 74.8 |
| Found | 23.6 | 75.7 |

Example V.—Preparation of 4-homo-2-chlorophenyl 2-((1-methoxy)ethoxy)ethanesulfonate In a manner similar to Example I methyl Cellosolve ($CH_3OCH_2CH_2OH$) was added dropwise to 4-bromo-2-chlorophenyl ethenesulfonate to give 72% yield of 4-bromo-2-chlorophenyl 2-((2-methoxy)ethoxy)ethanesulfonate, B.P. 157–162° C. (0.1 torr.).

| Analysis | Br, percent/w. | Cl, percent/w. | Acid elem., e./equiv. |
|---|---|---|---|
| Calculated for | 21.4 | 9.5 | 93.4 |
| Found | 21.6 | 9.4 | 95.0 |

Example VI.—Nematode control by seed treatment

Approximately 25–30 tomato seeds were soaked in 1000 p.p.m. of the test compound in water for 24 hours. The seeds were then removed, washed in clear water, and then planted in soil infested with the root-knot nematode, *Meloidogyne incognita* (var. acrita). After approximately six weeks, the plants were removed from the soil, their roots washed in running water and the roots were examined for root-knot infection. Table I lists the degree of control obtained.

TABLE I.—NEMATODE CONTROL BY SEED TREATMENT

| Compound: | Percent control |
|---|---|
| 4-bromo-2-chlorophenyl 2-methoxyethanesulfonate | 100 |
| 2,4-dichlorophenyl 2-hydroxyethanesulfonate | 57 |
| 2,4-dichlorophenyl 2-allyloxyethanesulfonate | 100 |
| 2,4-dichlorophenyl 2-ethoxyethanesulfonate | 93 |
| 4-bromo-2-chlorophenyl 2-((2-methoxy)ethoxy)ethanesulfonate | 96 |

Example VII.—Seed coat tests

Two ethanesulfonates were evaluated as seed treating agents on cotton seed for the control of root-knot nematodes. The active ingredient was employed in a seed coating formulation which consisted of activated carbon and methylcellulose. The active ingredient was used at a dosage of 10 percent by weight, based upon the weight of the seed. The two formulations employed were:

| | G. |
|---|---|
| 4-bromo-2-chlorophenyl 2-methoxyethanesulfonate | 40 |
| Activated carbon | 40 |
| Methyl cellulose | 25 |
| Cotton seed | 399 |
| 2,4-dichlorophenyl 2-allyloxyethanesulfonate | 80 |
| Activated carbon | 80 |
| Methyl cellulose | 50 |
| Cotton seed | 798 |

The treated seeds were planted in pots containing nematode infested soil, replicated four times per treatment. Cotton seed containing only the seed coater and carbon served as controls. After five weeks the cotton plant roots were washed and graded for nematode infestation. The 2,4-dichlorophenyl 2-allyloxyethanesulfonate seed treatment gave 60% control while the 4-bromo-2-chlorophenyl 2-methoxyethanesulfonate treatment gave 72% control.

It is apparent that the dihalophenyl sulfonates when used according to this invention are effective nematocides for the control of root parasitic nematodes. These compounds are residual in the soil; they are not excessively volatile, they do not leach or decompose readily. While effective as seed treatment agents against noxious nematodes, they do not appear to adversely affect hte germination of the seeds or harm the plant growth.

Thus, 2,4-dihalophenyl sulfonates of the invention have been found to be effective killers of soil-dwelling nematodes—that is, the unsegmented roundworms of the class Nematoda, also known as eelworms, which customarily inhabit soil and feed upon the roots of plants growing therein. Included are the cyst forming nematodes of the genus Heterodera, the stubby root nematodes of the genus Trichodorus, the bulb and stem nematodes of the genus Ditylenchus, the golden nematode (*Heterodera rostochiensis*), the root knot nematodes of the genus Meloidogyne, the root-lesion nematodes of the genus Pratylenchus, the citrus nematodes of the genus Tylenchulus, the sting nematodes of the genus Belonolaimus, and the plant-parasitic nematodes of such genera Naccobus, Radopholus, and the like.

The compounds used according to the method of the invention may be employed as liquid or as dust compositions.

Liquid compositions containing up to 50% by weight of the desired amount of the active agent may be prepared by dissolving the chemical in an inert organic solvent such as acetone, isopropyl alcohol, carbon tetrachloride or the like. By the use of suitable emulsifying and dispersing agents the sulfonates can be emulsified or dispersed in water and the emulsion applied to the soil to be treated to provide effective control of the nematodes therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5% of the weight of the formulation. Alternatively, or in addition, in some cases it may be of advantage to dissolve the sulfonate or sulfonates to be used in a solvent which can readily be dispersed in water to produce a heterogeneous dispersion of the nematocide in the water.

A modification of the wet process for treating seed is the so-called slurry method. The slurry method involves correctly proportioned quantities of seed and seed treating agent in the form of suspension brought together more or less continuously. Very little of the seed and treating agent are in the treating vessel at any one time and efficient coverage of the entire seed coat with the slurry is readily achieved. Slurry treated seed seldom requires a separate drying process. Slurry treatment of seed is commonly employed in the seed-treatment art.

For several types of seed it may be advantageous to employ solid seed-treatment formulations. The ethane-sulfonate may be blended with or impregnated onto a solid inert carrier. The carrier should not be hygroscopic so that the final formulation will remain dry and free flowing. Suitable inert carriers are those well known to the art including various grades of carbon, the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

It is essential that the seed coating formulation be brought in intimate contact with the seed. To achieve this, especially in the case of slurry and dust seed-coaters, it is frequently necessary to add such agents as methylcellulose or ethylcellulose to promote adherence. The quantity of such an adherence promoter required in the seed-coating formulation will vary from 0.1 percent by weight to about 20 percent by weight depending upon the formulation and the type of seed to be treated.

The quantity of the seed protectant formulation to give effective nematode control will vary with the type of formulation employed, the type of seed to be treated and the species of nematode to be controlled. In general approximately 0.1 an ounce to about 25 ounces of the formulation per 100 pounds of seeds will give effective nematode control.

The nematode seed-treating formulation may contain as well another pesticide, such as a fungicide or an insecticide or a plant growth promoting substance.

I claim as my invention:

1. A method for combatting soil-borne nematodes which comprises introducing into the soil seeds treated with a nematocidally effective amount of a compound of the formula:

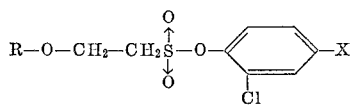

wherein R is a member of the group consisting of hydrogen, methyl, ethyl, methoxyethyl, and allyl; X is chlorine when R is a member of the group consisting of hydrogen, allyl and ethyl and X is bromine when R is a member of the group consisting of methyl and methoxyethyl.

2. A method for combatting soil-borne nematodes which comprises introducing into the soil seeds treated with a nematocidally effective amount of 4-bromo-2-chlorophenyl 2-methoxyethanesulfonate.

3. A method for combatting soil-borne nematodes which comprises introducing into the soil seeds treated with a nematocidally effective amount of 4-bromo-2-chlorophenyl 2-((2-methoxy)ethoxy)ethanesulfonate.

4. A method for combatting soil-borne nematodes which comprises introducing into the soil seeds treated with a nematocidally effective amount of 2,4-dichlorophenyl 2-hydroxyethanesulfonate.

5. A method for combatting soil-borne nematodes which comprises introducing into the soil seeds treated with a nematocidally effective amount of 2,4-dichlorophenyl 2-allyloxyethanesulfonate.

6. A method for combatting soil-borne nematodes which comprises introducing into the soil seeds treated with a nematocidally effective amount of 2,4-dichlorophenyl 2-ethoxyethanesulfonate.

7. A process for treating seed comprising soaking said seeds with a nematocidally effective amount of a compound of the formula

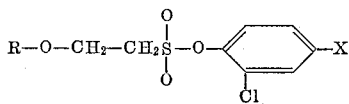

wherein R is a member of the group consisting of hydrogen, methyl, ethyl, methoxyethyl, and allyl; X is chlorine when R is a member of the group consisting of hydrogen, allyl and ethyl and X is bromine when R is a member of the group consisting of methyl and methoxyethyl.

8. The product obtained by the process of claim 7.

References Cited

UNITED STATES PATENTS 3,346,613   10/1967   Larson et al. _____ 260—456

LEWIS GOTTS, *Primary Examiner.*

S. K. ROSE, *Assistant Examiner.*